(12) United States Patent
Koide

(10) Patent No.: US 9,838,336 B2
(45) Date of Patent: Dec. 5, 2017

(54) COMMUNICATION SYSTEM, CONTROL APPARATUS, FORWARDING NODE, CONTROL METHOD AND PROGRAM

(71) Applicant: NEC Corporation, Tokyo (JP)

(72) Inventor: Toshio Koide, Tokyo (JP)

(73) Assignee: NEC CORPORATION, Tokyo (JP)

(*) Notice: Subject to any disclaimer, the term of this patent is extended or adjusted under 35 U.S.C. 154(b) by 87 days.

(21) Appl. No.: 14/772,905

(22) PCT Filed: Mar. 5, 2014

(86) PCT No.: PCT/JP2014/055679
§ 371 (c)(1),
(2) Date: Sep. 4, 2015

(87) PCT Pub. No.: WO2014/136850
PCT Pub. Date: Sep. 12, 2014

(65) Prior Publication Data
US 2016/0021028 A1 Jan. 21, 2016

(30) Foreign Application Priority Data
Mar. 6, 2013 (JP) .................. 2013-043908

(51) Int. Cl.
H04L 12/933 (2013.01)
H04L 12/751 (2013.01)
H04L 12/24 (2006.01)

(52) U.S. Cl.
CPC .............. H04L 49/15 (2013.01); H04L 41/12 (2013.01); H04L 45/02 (2013.01)

(58) Field of Classification Search
CPC .......... H04L 49/15; H04L 41/72; H04L 45/02
See application file for complete search history.

(56) References Cited

U.S. PATENT DOCUMENTS

2008/0189769 A1 8/2008 Casado et al.
2012/0314605 A1 12/2012 Akiyoshi
(Continued)

FOREIGN PATENT DOCUMENTS

JP 2005-311973 A 11/2005
WO WO 2008/095010 A1 8/2008
WO WO 2011/108205 A1 9/2011

OTHER PUBLICATIONS

International Search Report (ISR) (PCT Form PCT/ISA/210), in PCT/JP2014/055679, dated Apr. 1, 2014.
(Continued)

Primary Examiner — Albert T Chou
(74) Attorney, Agent, or Firm — McGinn IP Law Group, PLLC.

(57) ABSTRACT

A plurality of forwarding nodes includes: a topology holding unit that holds as first topology information connection relationship between an own node and at least part of the group of nodes; a topology notification unit that notifies a node(s) adjacent to the own node among the group of nodes of the first topology information; and an in-band communication unit that notifies a control apparatus of the first topology information. The control apparatus includes: a topology configuration unit that generates second topology information by combining a plurality of pieces of the first topology information notified by the plurality of forwarding nodes; and an in-band control unit that derives a path from the control apparatus to the plurality of forwarding nodes based on the second topology information and establishes a control channel for controlling the plurality of forwarding nodes along the derived path.

14 Claims, 12 Drawing Sheets

(56) References Cited

U.S. PATENT DOCUMENTS

| | | | |
|---|---|---|---|
| 2013/0028073 A1* | 1/2013 | Tatipamula | H04L 41/12 370/218 |
| 2013/0250770 A1* | 9/2013 | Zou | H04L 47/19 370/238 |
| 2016/0021028 A1* | 1/2016 | Koide | H04L 41/12 370/400 |
| 2016/0241491 A1* | 8/2016 | Tripathi | H04L 49/1523 |

OTHER PUBLICATIONS

Nick McKeown, et al. "OpenFlow: Enabling Innovation in Campus Networks," [online], [Searched on Mar. 4, 2013], the Internet <URL: http://www.openflow.org/documents/openflow-wp-latest.pdf>.

"OpenFlow Switch Specification" Version 1.1.0. (Wire Protocol 0x02), [online], [Searched on Mar. 4, 2013], the Internet <URL:http://www.openflow.org/documents/openflow-spec-v1.1.0.pdf>.

Toshio Koide, Hideyuki Shimonishi, "A study on the automatic construction mechanism of control network in OpenFlow-based network," IEICE Technical Report, The Institute of Electronics, Information and Communication Engineers, NS2009-165 (Mar. 2010), vol. 109, No. 448, pp. 19-24, Mar. 2010.

Toshio Koide, Hideyuki Shimonishi, "A consideration of unified topology discovery method of in-band control plane in OpenFlow-based networks," IEICE Technical Report, The Institute of Electronics, Information and Communication Engineers, ICM2012-70 (Mar. 2013), vol. 112, No. 492, pp. 65-69, Mar. 15, 2013 (Mar. 15, 2013).

* cited by examiner

FIG. 4

| 30A | TOPOLOGY INFORMATION 31A | SOURCE FORWARDING NODES 32A | SOURCE COMMUNICATION PORT 33A | |
|---|---|---|---|---|
| 30B | TOPOLOGY INFORMATION 31B | SOURCE FORWARDING NODES 32B | SOURCE COMMUNICATION PORT 33B | DESTINATION COMMUNICATION PORT 34B |

FIG. 5

| CONTROL APPARATUS, FORWARDING NODE | GRASPED TOPOLOGY |
|---|---|
| CONTROL APPARATUS 10A | #1 10A |
| FORWARDING NODE 20A | #2 20A #1 |
| FORWARDING NODE 20B | #2 20B #1 |
| FORWARDING NODE 20C | #2 20C |

FIG. 6

| TRANSMITTED PACKET | TOPOLOGY INFORMATION 31A | SOURCE FORWARDING NODE 32A | SOURCE COMMUNICATION PORT 33A |
|---|---|---|---|
| 40 | #2 — 20A — #1 | FORWARDING NODE 20A | #2 |
| 41 | #2 — 20A — #1 | FORWARDING NODE 20A | #1 |
| 42 | #2 — 20B — #1 | FORWARDING NODE 20B | #2 |
| 43 | #2 — 20B — #1 | FORWARDING NODE 20B | #1 |
| 44 | #2 — 20C | FORWARDING NODE 20C | #2 |

FIG. 7

| RECEIVED PACKET | TOPOLOGY INFORMATION 31B | | | SOURCE FORWARDING NODE 32B | SOURCE COMMUNICATION PORT 33B | DESTINATION COMMUNICATION PORT 34B |
|---|---|---|---|---|---|---|
| 40 | #2 | 20A | #1 | FORWARDING NODE 20A | #2 | #1 |
| 41 | #2 | 20A | #1 | FORWARDING NODE 20A | #1 | #2 |
| 42 | #2 | 20B | #1 | FORWARDING NODE 20B | #2 | #1 |
| 43 | #2 | 20B | #1 | FORWARDING NODE 20B | #1 | #2 |
| 44 | #2 | 20C | | FORWARDING NODE 20C | #2 | #1 |

COMMUNICATION SYSTEM, CONTROL APPARATUS, FORWARDING NODE, CONTROL METHOD AND PROGRAM

REFERENCE TO RELATED APPLICATION

The present invention is based upon and claims the benefit of the priority of Japanese patent application No. 2013-043908 filed on Mar. 6, 2013, the disclosure of which is incorporated herein in its entirety by reference thereto.

TECHNICAL FIELD

The present invention relates to a communication system, control apparatus, forwarding node, control method, and program, and particularly to a communication system configured so that a control apparatus centrally manages forwarding nodes provided in a network using control information and grasps the connection states among the forwarding nodes, a control apparatus and forwarding node in such a communication system, and a control method and program for controlling the communication system.

BACKGROUND

As a communication system in which a control apparatus centrally controls forwarding nodes, a technology called OpenFlow is known (Patent Literature 1 and Non-Patent Literatures 1 and 2). OpenFlow treats communication as an end-to-end flow and performs path control, failure recovery, load balancing, and optimization for each flow. An OpenFlow switch, specified in Non-Patent Literature 2, comprises a secure channel for communicating with an OpenFlow controller, which can be positioned as a control apparatus, and operates according to a flow table, an addition to or rewriting of which is suitably instructed by the OpenFlow controller. In the flow table, a set of matching rules (Header Field) to be matched against a packet header, flow statistics (Counters), and actions (Actions) defining the processing contents is defined for each flow.

For instance, upon receiving a packet, the OpenFlow switch searches for an entry having a matching rule that matches the header information of the received packet in the flow table. When an entry matching the received packet is found as a result of the search, the OpenFlow switch updates the flow statistics (Counters) and performs the processing contents (packet transmission from a designated port, flooding, discard, etc.) written in the action field of the entry on the received packet. On the other hand, when no entry matching the received packet is found as a result of the search, the OpenFlow switch forwards the received packet to the OpenFlow controller via a secure channel, requests the controller to determine a packet path on the basis of the source and destination of the received packet, receives a flow entry that realizes this, and updates the flow table. As described, the OpenFlow switch forwards a packet using an entry stored in the flow table as control information.

Non-Patent Literature 3 describes a technology that constructs a secure channel in the OpenFlow network in an actual network using a special frame and source routing. Hereinafter, a control channel constructed in an actual network is referred to as "in-band secure channel."

Patent Literature 1:
International Publication Number WO/2008/095010
Non-Patent Literature 1:
Nick McKeown, et al. "OpenFlow: Enabling Innovation in Campus Networks," [online], [Searched on Mar. 4, 2013], the Internet <URL: http://www.openflow.org/documents/openflow-wp-latest.pdf>
Non-Patent Literature 2:
"OpenFlow Switch Specification" Version 1.1.0. (Wire Protocol 0x02), [online], [Searched on Mar. 4, 2013], the Internet <URL:http://www.openflow.org/documents/openflow-spec-v1.1.0.pdf>
Non-Patent Literature 3:
Toshio Koide, Hideyuki Shimonishi, "A study on the automatic construction mechanism of control network in OpenFlow-based network," IEICE Technical Report, The Institute of Electronics, Information and Communication Engineers, NS2009-165 (2010-3), Vol. 109, No. 448, pp. 19-24, March 2010

SUMMARY

Technical Problem

The disclosure of each Patent Literatures and Non-Patent Literatures cited above is incorporated herein in its entirely by reference thereto. The following analysis is given by the present inventor.

By using the method in Non-Patent Literature 3, it is possible to construct a network compatible with the OpenFlow at corporations or homes by using an in-band secure channel without using a network dedicated to control.

An in-band secure channel is established between a control apparatus that functions as an OpenFlow controller and a forwarding node that functions as an OpenFlow switch. Non-Patent Literature 3 describes the construction of an in-band secure channel using source routing.

The path of an in-band secure channel is a path calculated based on the topology information of the entire network grasped by the control apparatus in advance. In an initial state, the control apparatus cannot communicate with a forwarding node that is not physically adjacent thereto, and nor can it obtain the control rights over the forwarding node. Therefore, there is a problem that the control apparatus is unable to discover the topology information of the entire network.

In order to resolve this problem, Non-Patent Literature 3 describes a method in which the topology information of the entire network is discovered by obtaining the control rights over a forwarding node adjacent to the control apparatus, the repeating the operation of obtaining the control rights over a forwarding node adjacent to the forwarding node, and ultimately obtaining the control rights over all forwarding nodes.

However, according to the method in Non-Patent Literature 3, it takes a long time to obtain the control rights over all forwarding nodes since the topology is discovered sequentially, and there is a risk that the amount of the control information that travels over the network will be enormous. Further, according to this method, when there is a change in the network topology due to the addition or deletion of a forwarding node, or the addition, deletion or failure of a communication link between the forwarding nodes, it is difficult to respond to the change immediately. Further, when the change is responded immediately, a load is applied on the network due to a large amount of control information, and the network performance may deteriorate.

Therefore, it is desired that the control apparatus reduces the time required to discover the topology of the entire network and reduces the transmission/reception loads of the control information required to discover the topology.

According to a first aspect of the present invention, there is provided a communication system, comprising: a group of nodes including a plurality of forwarding nodes and a control apparatus that controls the plurality of forwarding nodes. The plurality of forwarding nodes comprises: a topology holding unit that holds as first topology information connection relationship between an own node and at least part of the group of nodes; a topology notification unit that notifies a node(s) adjacent to the own node among the group of nodes of the first topology information; and an in-band communication unit that notifies the control apparatus of the first topology information. The control apparatus comprises: a topology configuration unit that generates second topology information by combining a plurality of pieces of the first topology information notified by the plurality of forwarding nodes; and an in-band control unit that derives a path from the control apparatus to the plurality of forwarding nodes based on the second topology information and establishes a control channel for controlling the plurality of forwarding nodes along the derived path.

According to a second aspect of the present invention, there is provided a forwarding node among a plurality of forwarding nodes controlled by a control apparatus. The forwarding node comprises: a topology holding unit that holds as first topology information connection relationship between an own node and at least part of a group of nodes including the control apparatus and the plurality of forwarding nodes; a topology notification unit that notifies a node(s) adjacent to the own node among the group of nodes of the first topology information; and an in-band communication unit that notifies the control apparatus of the first topology information.

According to a third aspect of the present invention, there is provided a control apparatus for controlling a plurality of forwarding nodes. The plurality of forwarding nodes hold as first topology information connection relationship between an own node and at least part of a group of nodes including the plurality of forwarding nodes and the control apparatus, and notify the control apparatus and a node(s) adjacent to the own node among the group of nodes of the first topology information. The control apparatus comprises: a topology configuration unit that generates second topology information by combining a plurality of pieces of the first topology information notified by the plurality of forwarding nodes; and an in-band control unit that derives a path from the control apparatus to the plurality of forwarding nodes based on the second topology information and establishes a control channel for controlling the plurality of forwarding nodes along the derived path.

According to a fourth aspect of the present invention, there is provided a control method for controlling a plurality of forwarding nodes using a control apparatus. The control method comprises: by the plurality of forwarding nodes, holding as first topology information connection relationship between an own node and at least part of a group of nodes including the plurality of forwarding nodes and the control apparatus; notifying a node(s) adjacent to the own node among the group of nodes of the first topology information; notifying the control apparatus of the first topology information. Further, the control method comprises: by the control apparatus, generating second topology information by combining a plurality of pieces of the first topology information notified by the plurality of forwarding nodes; deriving a path from the control apparatus to the plurality of forwarding nodes based on the second topology information; and establishing a control channel for controlling the plurality of forwarding nodes along the derived path.

According to a fifth aspect of the present invention, there is provided a control method, comprising: by one of a plurality of forwarding nodes controlled by a control apparatus, holding as first topology information connection relationship between an own node and at least part of a group of nodes including the control apparatus and the plurality of forwarding nodes; notifying a node(s) adjacent to the own node among the group of nodes of the first topology information; and notifying the control apparatus of the first topology information.

The present invention provides the following advantages, but not restricted thereto. According to the communication system, forwarding node, control apparatus and control method relating to the present invention, it becomes possible to shorten the time required for a control apparatus to discover the topology of the entire network and to reduce the transmission/reception loads of control information required to discover the topology.

BRIEF DESCRIPTION OF THE DRAWINGS

FIG. 4 is a drawing showing a configuration of transmission topology information and reception topology information as an example.

FIG. 5 is a drawing showing a list of topology information grasped by a control apparatus and a forwarding node in an initial state.

FIG. 6 is a drawing showing transmission topology information 30A transmitted from each of forwarding nodes 20A to 20C in an initial state.

FIG. 7 is a drawing showing reception topology information 30B received by a control apparatus 10A and the forwarding nodes 20A to 20C.

PREFERRED MODES

Figure 1:
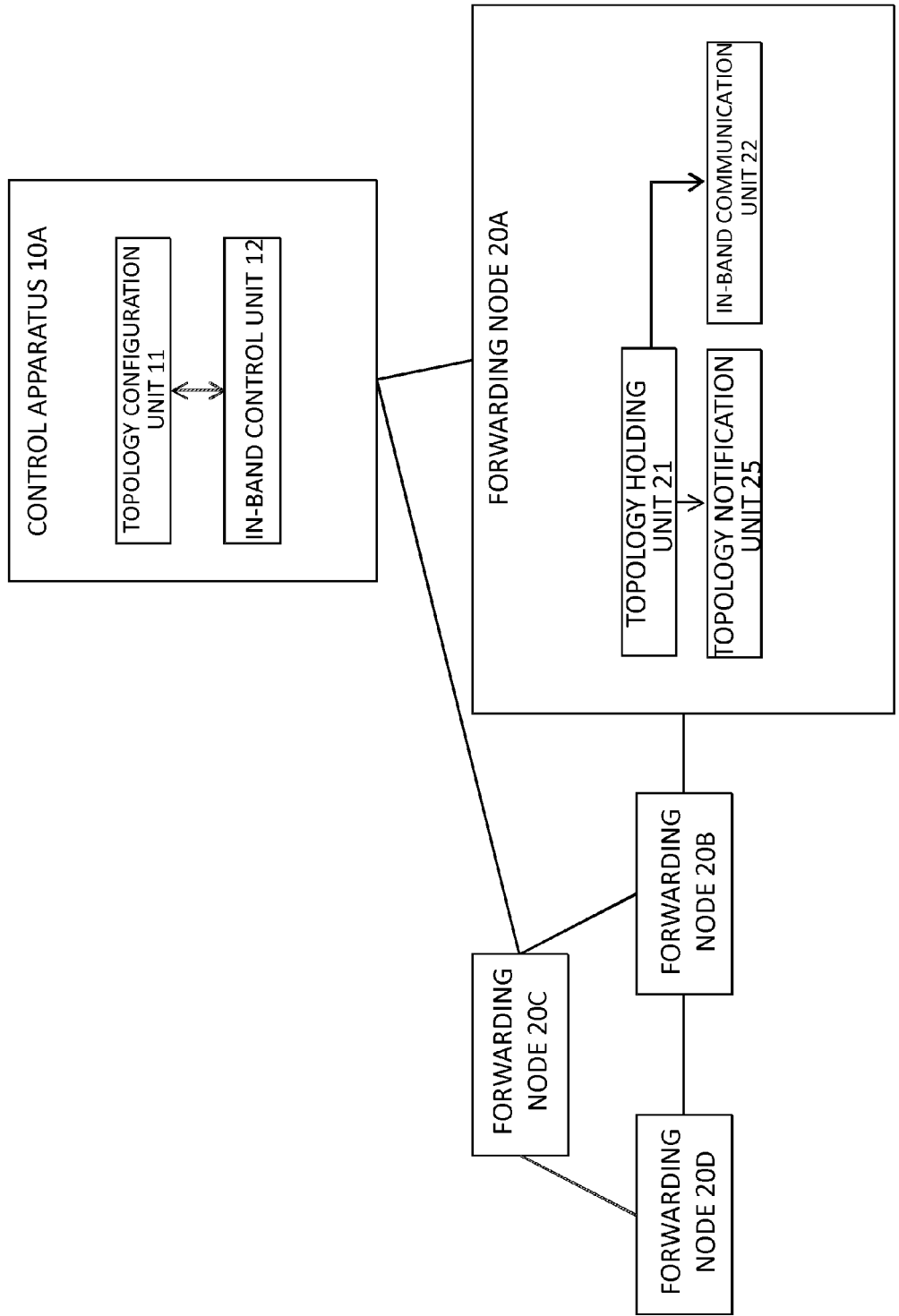
FIG. 1 is a block diagram showing a configuration of a communication system relating to an exemplary embodiment as an example.

In the present disclosure, there are various possible modes, which include the following, but not restricted thereto. First, a summary of an exemplary embodiment will be described. Note that drawing reference signs in the summary are given solely to facilitate understanding for convenience and are not intended to limit the present invention to the modes shown in the drawings.

FIG. 1 shows an example of the configuration of a communication system relating to an exemplary embodiment. In FIG. 1, the communication system comprises a group of nodes including a plurality of forwarding nodes (20A to 20D) and a control apparatus (10A) that controls the plurality of forwarding nodes (20A to 20D). The plurality of forwarding nodes (20A to 20D) comprise a topology holding unit (21) that holds as first topology information connection relationship between the own node and at least part the group of nodes, a topology notification unit (25) that notifies the first topology information to a node(s) among the group of nodes adjacent to the own node, and an in-band communication unit (22) that notifies the first topology information to the control apparatus (10A).

The control apparatus (10A) comprises a topology configuration unit (11) that integrates a plurality of pieces of the first topology information notified by the plurality of forwarding nodes (20A to 20D) to generate second topology information, and an in-band control unit (12) that derives a path from the control apparatus (10A) to the plurality of forwarding nodes based on the second topology information and establishes a control channel for controlling the plurality of forwarding nodes along the derived path.

The topology holding unit (for instance, the topology holding unit 21 of the forwarding node 20A) may update the first topology information held in the own node based on the first topology information received from the node (20B) adjacent to the local node (20A) among the plurality of forwarding nodes (20A to 20D). Further, the topology holding unit (for instance, the topology holding unit 21 of the forwarding node 20A) may hold as the first topology information connection relationship between the own node (20A) and nodes (10A and 20B) within a predetermined hop number (for instance 1 hop) from the local node (20A) among the group of nodes. Further, the topology holding unit (for instance the topology holding unit 21 of the forwarding node 20A) may hold as the first topology information connection relationship between the own node (20A) and a node(s) within a predetermined physical distance from the local node (20A) among the group of nodes or a node(s) of which the communication delay from the own node (20A) is within a predetermined period of time.

The topology notification unit (for instance, the topology notification unit 25 of the forwarding node 20) may use any of the following as a condition (a transmission timing condition) for notifying the first topology information to nodes (10A and 20B) adjacent to the own node (20A) among the group of nodes: the first topology information held by the topology holding unit (21) has been updated, a predetermined time period has passed since an update, a predetermined time period has passed since the previous notification, and any combination of the above.

According to such a communication system, it is possible to reduce the time required for the control apparatus (10A) to discover the topology of the entire network and reduce the transmission/reception loads of control information required to discover the topology, compared with the related technology (Non-Patent Literature 3) described in Background.

In addition, the control apparatus (10A) may comprise a condition instruction unit (not shown in FIG. 1) that instructs a predetermined number of hops (or predetermined distance or time period) to the plurality of forwarding nodes (20A to 20D) via an established control channel. Further, the control apparatus (10A) may comprise a condition instruction unit that instructs the above conditions (transmission timing conditions) to the plurality of forwarding nodes (20A to 20D) via the established control channel.

According to such a communication system, it is possible for the control apparatus (10A) to centrally manage the control of the amount of packets exchanged to discover the state of the topology and the control of the time required to discover any change in the topology, facilitating the reflection of the network operation policy of a network operator.

The communication system relating to the present invention will be described in detail using exemplary embodiments below.

Exemplary Embodiment 1

Figure 2:
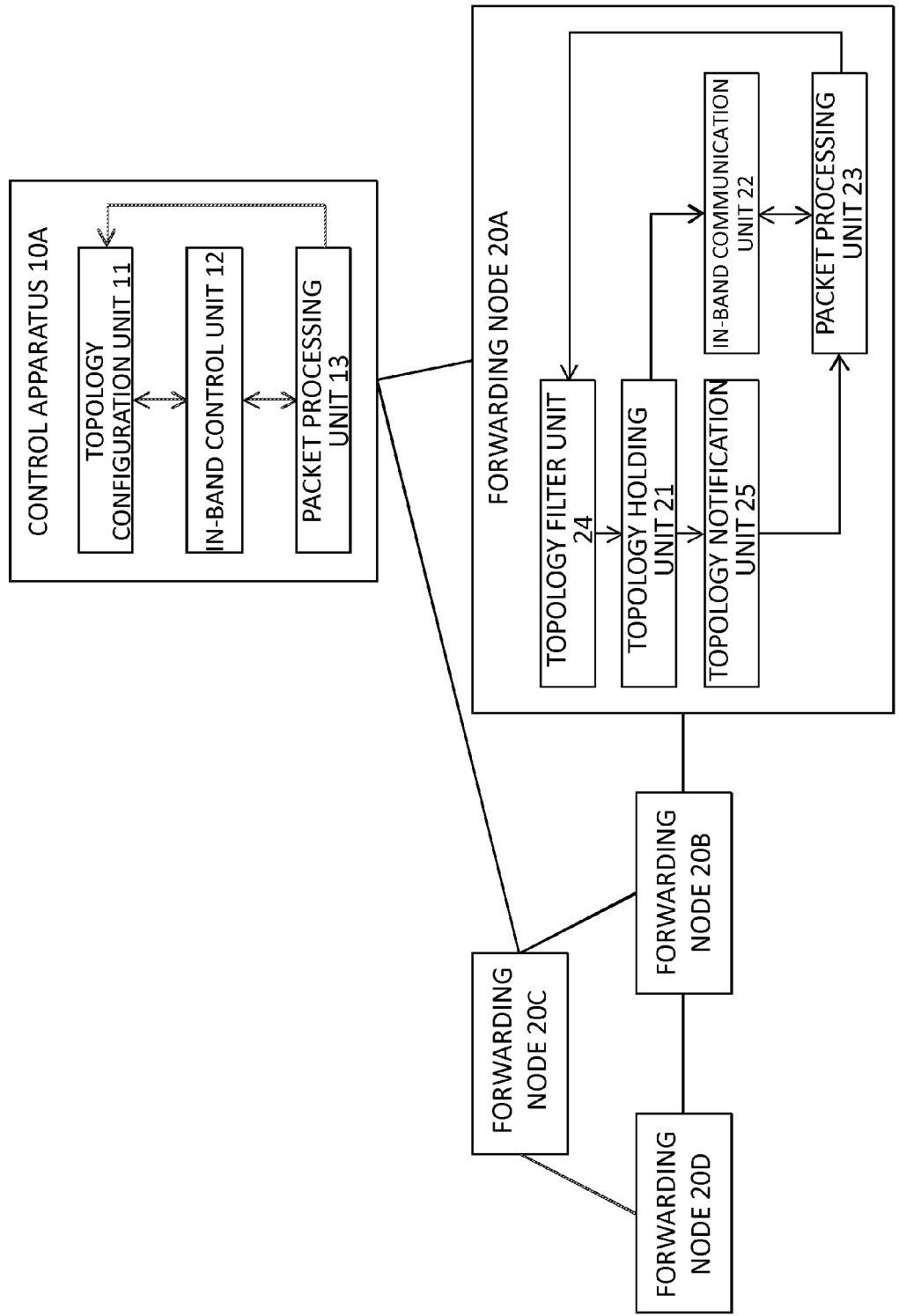
FIG. 2 is a block diagram showing a configuration of a communication system of a first exemplary embodiment as an example.

A communication system relating to a first exemplary embodiment will be described in detail with reference to the drawings. FIG. 2 is a block diagram showing the configuration of the communication system relating to the present exemplary embodiment as an example. FIG. 2 shows that the communication system comprises forwarding nodes 20A to 20D and a control apparatus 10A that controls the forwarding nodes 20A to 20D.

FIG. 2 illustrates a case where the communication system comprises four forwarding nodes 20A to 20D. FIG. 2 also illustrates a case where the control apparatus 10A is connected to two forwarding nodes 20A and 20C. Note that the connection relationship of the forwarding nodes and the number of forwarding nodes are not limited to the mode illustrated in FIG. 2. The control apparatus 10A needs to have at least one forwarding node connected thereto, and the number of forwarding nodes connected to the control apparatus 10A may be one, three or greater.

The control apparatus 10A comprises a topology configuration unit 11 that generates topology information by discovering connection information among the forwarding nodes 20A to 20D, an in-band control unit 12 that establishes a channel to the forwarding nodes 20A to 20D and transmits/receives control information, and a packet processing unit 13 that transmits, receives and distributes a packet.

The topology configuration unit 11 requests topology information grasped by the forwarding nodes 20A to 20D via the in-band control unit 12 and receives a topology information response as a reply thereto. Further, the topology configuration unit 11 discovers and holds the topology information of the entire network by assembling partial pieces of topology information included in the topology information responses received. Further, the topology configuration unit 11 updates and holds the topology information of the entire network on the basis of topology information supplied by the packet processing unit 13. Also, the topology configuration unit 11 replies the topology information held therein in response to a reference request from the in-band control unit 12.

The in-band control unit 12 grasps the presence of the forwarding nodes 20A to 20D by referring to the topology information of the entire network held by the topology configuration unit 11. Moreover, the in-band control unit 12 calculates a forwarding path for the channel established between each forwarding node and the control apparatus 10A, and establishes a control channel along each forwarding path.

The packet processing unit 13 transmits/receives a packet to/from the forwarding nodes 20A and 20C connected to the control apparatus 10A and distributes only a packet required for the in-band control unit 12 from the transmitted/received packets to the in-band control unit 12. In addition, when receiving a piece of topology information, the packet processing unit 13 configures the topology information with information of a communication port that received it, and outputs the result to the topology configuration unit 11.

Each of the forwarding nodes 20A to 20D comprises a topology holding unit 21 that holds surrounding topology information known to each node, an in-band communication unit 22 that establishes a channel with the control apparatus 10A and transmits/receives control information, a packet processing unit 23 that transmits, receives and distributes a packet, a topology filter unit 24 that reduces the amount of topology information to a predetermined range, and a topology notification unit 25 that notifies topology information to surrounding forwarding nodes.

The topology holding unit 21 holds surrounding topology information of the local node, provides the held topology information in response to a request from the in-band communication unit 22 and the topology notification unit 25, and combines and updates topology information supplied by the topology filter unit 24 and the held topology information. In addition, when there is a change in the topology, the topology holding unit 21 notifies the topology notification unit 25 of the change. In an initial state, the topology holding unit 21 holds topology information constituted by only information of the local node.

The in-band communication unit 22 establishes a control channel with the control apparatus 10A according to control of the control apparatus 10A and instructs the packet processing unit 23 to forward a control channel of another forwarding node in accordance with control of the control apparatus 10A. Further, the in-band communication unit 22 makes an inquiry about topology information to the topology holding unit 21 via the packet processing unit 23 in response to a topology information request received from the control apparatus 10A. Moreover, the in-band communication unit 22 transmits the obtained topology information to the control apparatus 10A via the packet processing unit 23 as a topology information response.

The packet processing unit 23 transmits/receives a packet from/to the other forwarding nodes or the control apparatus 10A. Further, when receiving topology information, the packet processing unit 23 outputs it to the topology filter unit 24 with the information of a communication port that received the topology information. Further, the packet processing unit 23 supplies/outputs a packet transmitted/received to/from the control apparatus 10A to the in-band communication unit 22. In addition, the packet processing unit 23 transmits topology information supplied by the topology notification unit 25 with forwarding node information and the communication port information used for transmission. Further, the packet processing unit 23 forwards a control channel of another forwarding node in accordance with an instruction from the in-band communication unit 22.

The topology filter unit 24 reduces the amount of the topology information supplied by the packet processing unit 23 to a predetermined range and outputs the result to the topology holding unit 21. The topology filter unit 24 may use a filter condition, for instance setting the predetermined range as nodes within a predetermined number of hops surrounding the local node. In this case, the topology filter unit 24 reduces the supplied topology information to the topology constituted by only the topology of nodes within the predetermined number of hops surrounding the local node. Note that the filter condition created and applied by the topology filter unit 24 is not limited thereto. It is possible to determine the attributes of the topology information held by the topology holding unit 21 according to the filter condition.

The topology notification unit 25 obtains the topology information held by the topology holding unit 21 and instructs the packet processing unit 23 to notifies surrounding forwarding nodes of the information. Further, if a control channel with the control apparatus 10A has been established, the topology notification unit 25 can notify the control apparatus 10A of the topology information held by the topology holding unit 21. As for the timing when the topology notification unit 25 outputs the topology information (a transmission timing condition), the topology notification unit 25 may output it immediately after the topology holding unit 21 is updated or when there is no update for a predetermined period of time after the last update. Further, regardless of the presence of an update, the topology notification unit 25 may transmit topology information on a regular basis. Any transmission timing condition can be created and applied, and it is possible to control the total number of packets discovering topology information and the convergence of topology information discovery according to the transmission timing condition.

As described above, the communication system relating to the present exemplary embodiment comprises the plurality of forwarding nodes 20A to 20D that partially discover the topology and transmits/receives control information and the control apparatus 10A that controls the forwarding nodes using the control information. The control apparatus 10A comprises the topology configuration unit 11 that discovers and configures the connection information among the forwarding nodes, and the in-band control unit 12 that determines a forwarding path for control information for each forwarding node on the basis of the information of the topology configuration unit 11 and establishes a control channel in accordance with each forwarding path. In addition, each forwarding node comprises the topology holding unit 21 that holds surrounding topology information known to each node, the topology notification unit 25 that notifies surrounding forwarding nodes of this topology information, the topology filter unit 24 that reduces the amount of the received topology information to a predetermined range and registers the result in the topology holding unit 21, and the in-band communication unit 22 that replies the topology information to the control apparatus 10A in response to a request from the control apparatus 10A.

According to the communication system, it is possible to shorten the time required to discover the topology of the entire network needed in a case where a centralized control network represented by OpenFlow is constructed and to reduce the transmission/reception loads of control information required to discover the topology.

Next, the operation of the communication system (FIG. 1) of the present exemplary embodiment will be described using a concrete example in which three forwarding nodes 20A to 20C and the control apparatus 10A are connected in series.

Figure 3:
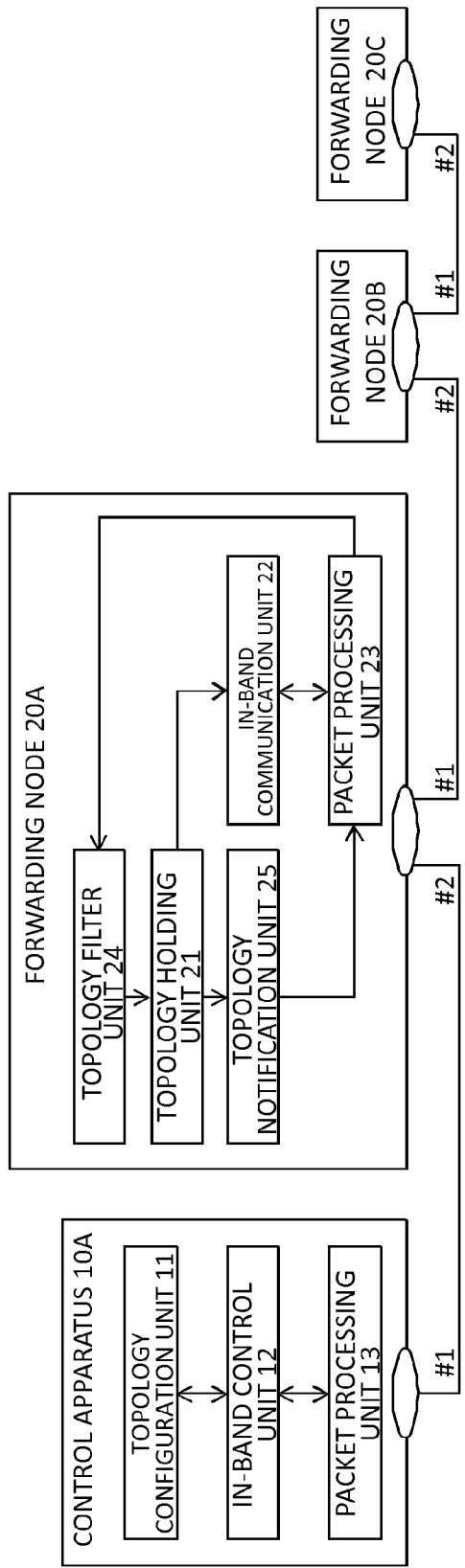
FIG. 3 is a drawing for explaining an example of an operation of the communication system relating to the first exemplary embodiment.

FIG. 3 is a drawing for explaining the operation of the communication system relating to the present exemplary embodiment. FIG. 3 shows that the control apparatus 10A and the three forwarding nodes 20A to 20C are connected in series in the communication system. In FIG. 3, signs #1 and #2 given between the control apparatus 10A and the three forwarding nodes 20A to 20C indicate the identifiers of communication ports.

Here, the contents of a packet transmitted by the forwarding nodes 20A to 20C will be described. The packet processing unit 23 of each forwarding node receives and outputs a packet including the information of a communication port used and the information of a source forwarding node when topology information is transmitted/received. FIG. 4 shows information included in transmission topology information 30A included in a transmitted packet and information included in reception topology information 30B constituted by a received packet. Further, how pieces of information in the transmission topology information 30A and in the reception topology information 30B are arranged is not limited to the mode shown in FIG. 4. Further, the transmission topology information 30A and the reception topology information 30B may include information other than the information shown in FIG. 4.

The transmission topology information 30A is constituted when topology information is transmitted. The transmission topology information 30A includes pieces of information, each representing topology information 31A, a source forwarding node 32A, and a source communication port 33A. The reception topology information 30B is constituted when topology information is received. The reception topology information 30B includes a piece of information representing a destination communication port 34B in addition to the information included in the transmission topology information 30A.

FIG. 5 is a drawing showing a list of topology information grasped by the control apparatus 10A and the forwarding nodes 20A to 20C in an initial state. FIG. 5 shows that, in an initial state, each topology holding unit 21 of the forwarding nodes 20A to 20C and the topology configuration unit 11 of the control apparatus 10A hold topology information that does not include the other forwarding nodes or the control apparatus 10A although each topology information includes the local node.

Each topology notification unit 25 of the forwarding nodes 20A to 20C starts a periodic operation, asks the topology holding unit 21 for topology information, obtains the information, and configures a packet that includes the transmission topology information 30A including the topology information acquired via the packet processing unit 23. The topology notification unit 25 transmits a configured packet to a node adjacent to the local node, out of the control apparatus 10A and the forwarding nodes 20A to 20C.

FIG. 6 shows the transmission topology information 30A transmitted from each of the forwarding node 20A, 20B, and 20C in an initial state. FIG. 6 shows that the forwarding node 20A configures the transmission topology information 30A that includes topology information including only the forwarding node 20A for the communication port #2 and transmits a packet 40 that includes a communication port #A from the communication port #2. In addition, the forwarding node 20A configures the transmission topology information 30A that includes topology information including only the forwarding node 20A for the communication port #1 and transmits a packet 41 that includes the communication port #1 from the communication port #1. Similarly, the forwarding node 20B transmits packets 42 and 43 from the communication port #2 and #1, respectively. Further, the forwarding node 20C also transmits a packet 44 from the communication port #2.

The control apparatus 10A receives the packet 40 transmitted from the forwarding node 20A. The packet processing unit 13 configures the received packet 40 as the reception topology information 30B.

FIG. 7 shows the reception topology information 30B received by the control apparatus 10A and the forwarding nodes 20A to 20C. Further, FIG. 8 shows a list of topology information grasped by the control apparatus 10A and the forwarding nodes 20A to 20C after the packets 40 to 44 are received.

The first line in FIG. 7 shows the reception topology information 30B constituted by the packet 40 received by the control apparatus 10A. The first line in FIG. 7 shows that a source forwarding node 32B is the forwarding node 20A, a source communication port 33B is the communication port #2, and the destination communication port 34B is the communication port #1. At this time, the packet processing unit 13 discovers that the communication port #2 of the forwarding node 20A and the communication port #1 of the control apparatus 10A are connected by a communication link and outputs this fact as a piece of topology information to the topology configuration unit 11.

Figure 8:
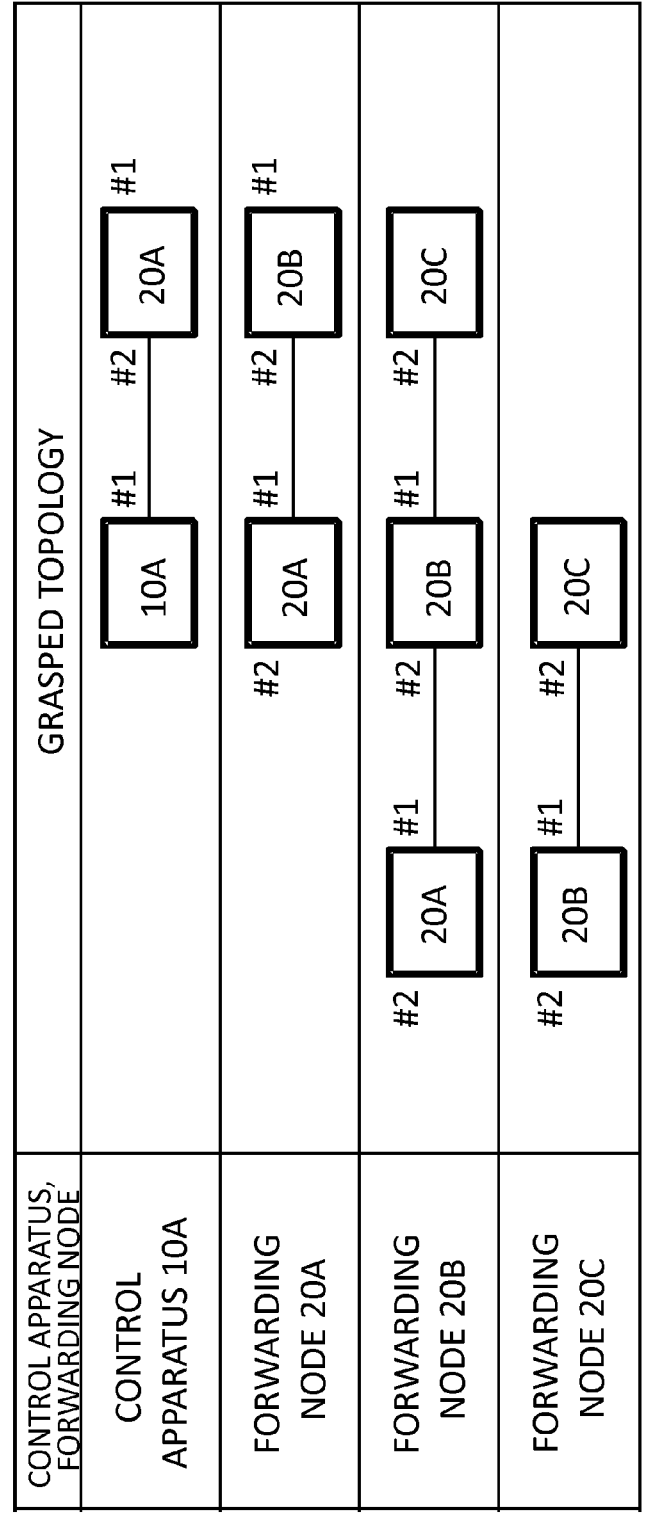
FIG. 8 is a drawing showing topology information configured and held by a topology configuration unit.

The topology configuration unit 11 receives the topology information from the packet processing unit 13, and then configures and holds topology information in which the communication port #2 of the forwarding node 20A and the communication port #1 of the control apparatus 10A are connected by a communication link, as shown in FIG. 8.

Similarly, the forwarding node 20A receives the packet 42 transmitted by the forwarding node 20B. The packet processing unit 23 configures the received packet 42 as the reception topology information 30B. The third line of FIG. 7 shows the reception topology information 30B configured from the received packet 42. The third line of FIG. 7 shows that the source forwarding node is the forwarding node 20B, the source communication port is the communication port #2, and the destination communication port is the communication port #1. At this time, the packet processing unit 23 of the forwarding node 20A discovers that the communication port #2 of the forwarding node 20B and the communication port #1 of the forwarding node 20A are connected by a communication link, and outputs this fact as a piece of topology information to the topology filter unit 24.

The topology filter unit 24 of the forwarding node 20A processes the topology information supplied by the packet processing unit 23 on the basis of a specified filter condition. Here, a filter condition is assumed to dictate that the topology up to the forwarding nodes adjacent to the local node should be held. In this case, the supplied topology information fits into such a filter condition. Therefore, the topology filter unit 24 outputs the topology information to the topology holding unit 21 without processing the topology information.

When receiving the topology information from the topology filter unit 24, the topology holding unit 21 of the forwarding node 20A configures and holds topology information in which the communication port #2 of the forwarding node 20B and the communication port #1 of the forwarding node 20A are connected by a communication link, as shown in FIG. 8.

The forwarding node 20B receives the packet 41 transmitted by the forwarding node 20A and the packet 44 transmitted by the forwarding node 20C. The forwarding node 20C receives the packet 43 transmitted by the forwarding node 20B. Each of the forwarding nodes 20B and 20C also operates similarly as the forwarding node 20A, and configures and holds topology information as shown in FIG. 8.

The topology configuration unit 11 of the control apparatus 10A discovers the presence of the forwarding node 20A by updating the topology information and instructs the in-band control unit 12 to establish a control channel. As a method for establishing a control channel between the control apparatus 10A and the forwarding node 20A, the method described in Non-Patent Literature 3 can be used for instance. However, the method for establishing a control channel is not limited thereto.

The topology configuration unit 11 requests topology information from the forwarding node 20A using the control channel established between the forwarding node 20A and the control apparatus 10A. This topology information request is supplied to the in-band communication unit 22 of the forwarding node 20A via the in-band control unit 12 and the established control channel.

The in-band communication unit 22 of the forwarding node 20A makes an inquiry on topology information to the topology holding unit 21 according to the supplied topology information request and returns a topology information response including the acquired topology information. The topology information response is supplied to the in-band control unit 12 of the control apparatus 10A via the established control channel with the control apparatus 10A.

The in-band control unit 12 of the control apparatus 10A outputs topology information included in the supplied topology information response to the topology configuration unit 11. The topology configuration unit 11 combines the supplied topology information and topology information currently held by the topology configuration unit 11 and discovers a wider range of topology information.

Figure 9:
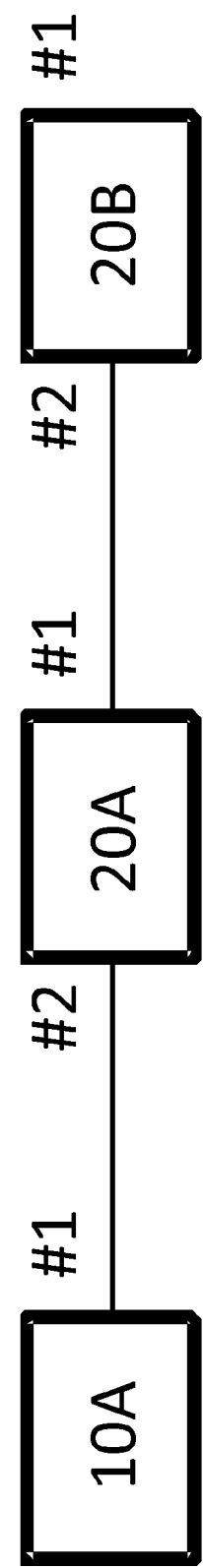
FIG. 9 is a drawing showing topology information grasped by the control apparatus 10A.

FIG. 9 is a drawing showing the topology information grasped by the control apparatus 10A. FIG. 9 shows that the control apparatus 10A is able to grasp topology information encompassing the control apparatus 10A and the forwarding nodes 20A and 20B at this point.

Similarly, the topology configuration unit 11 of the control apparatus 10A discovers the presence of the forwarding node 20B by updating the topology information. Next, the topology configuration unit 11 instructs the in-band control unit 12 to establish a control channel of the forwarding node 20B and transmits a topology information request. As a result, the topology configuration unit 11 receives the topology information of the forwarding node 20B as a topology information response, combines the received information with the topology information currently held by the topology configuration unit 11, and discovers the topology information of the entire network.

Figure 10:
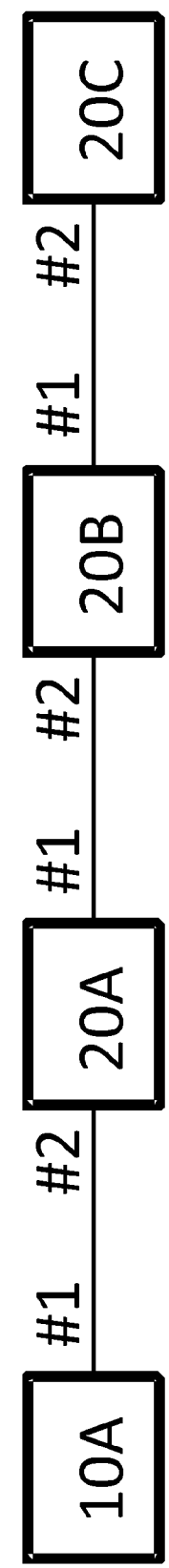
FIG. 10 is a drawing showing topology information grasped by the control apparatus 10A.

FIG. 10 is a drawing showing the topology information grasped by the control apparatus 10A. FIG. 10 shows that the control apparatus 10A is able to grasp the topology information of the entire network at this point.

Similarly, the topology configuration unit 11 of the control apparatus 10A discovers the presence of the forwarding node 20C by updating the topology information. Next, the topology configuration unit 11 instructs the in-band control unit 12 to establish a control channel of the forwarding node 20C.

As described, the control apparatus 10A can establish the control channels with all the forwarding nodes 20A to 20C.

Thereafter, unless a topology change occurs, the forwarding nodes 20A and 20C maintain the state, in which the topology up to adjacent nodes are held, using a condition, set by the topology filter unit 24 as a filter condition, that the topology up to the forwarding nodes adjacent to the local node should be held.

According to the present exemplary embodiment, each forwarding node is able to maintain the latest state of the topology information up to the nodes adjacent to the local node. As a result, if there is any topology change in a certain area of the network, it is possible to notify the change, reduce the amount of packet exchanges for discovering the latest topology state, thereby reducing the load of the entire network. Further, the control apparatus 10A is able to discover any change in the topology via the control channel, and the notifications thereof are limited to those from the forwarding nodes surrounding the area where the topology change has occurred. Therefore, the control apparatus 10A is able to discover any change in the topology immediately and is able to further reduce the load of the entire network by reducing the amount of packet exchanges.

Exemplary Embodiment 2

Figure 11:
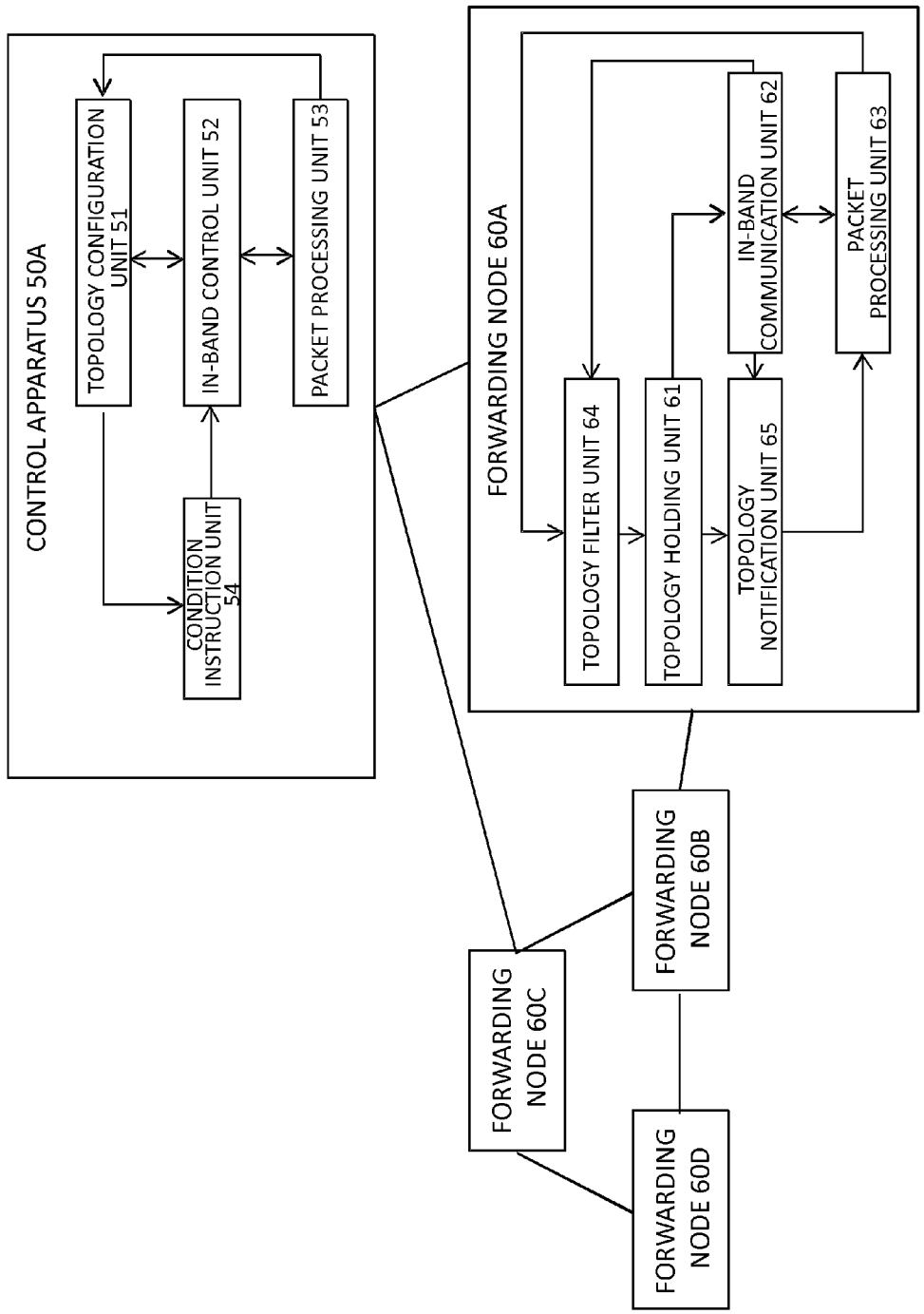
FIG. 11 is a block diagram showing a configuration of a communication system relating to a second exemplary embodiment as an example.

Next, a communication system relating to a second exemplary embodiment will be described in detail with reference to the drawings. FIG. 11 is a block diagram showing the configuration of the communication system relating to the present exemplary embodiment as an example. FIG. 11 shows that the communication system relating to the present exemplary embodiment comprises forwarding nodes 60A to 60D and a control apparatus 50A that controls the forwarding nodes 60A to 60D as in the communication system relating to the first exemplary embodiment.

The control apparatus 50A further comprises a condition instruction unit 54, in addition to the configuration of the control apparatus 10A of the first exemplary embodiment (FIG. 2).

A topology configuration unit 51 operates in the same manner as the topology configuration unit 11 of the first exemplary embodiment, except that the topology configuration unit 51 replies topology information held therein in response to a reference request from the condition instruction unit 54.

An in-band control unit 52 and a packet processing unit 53 operate in the same manner as the in-band control unit 12 and the packet processing unit 13, respectively, in the control apparatus 10A of first exemplary embodiment.

The condition instruction unit 54 discovers the presence of the forwarding nodes 60A to 60D by referring to the topology information of the entire network held by the topology configuration unit 51. Further, the condition instruction unit 54 specifies for each of the forwarding node 60A to 60D any one or both of a filter condition to be set in a topology filter unit 64 of the forwarding nodes 60A to 60D and a transmission timing condition to be set in a topology notification unit 65 via a control channel established by the in-band control unit 52.

The forwarding nodes 60A to 60D are configured identically to the forwarding nodes 20A to 20D relating to the first exemplary embodiment.

An in-band communication unit 62 operates in the same manner as the in-band communication unit 22 in the first exemplary embodiment, except that the in-band communication unit 62 outputs a filter condition specified by the condition instruction unit 54 of the control apparatus 50A to the topology filter unit 64 and outputs a transmission timing condition to the topology notification unit 65.

The topology filter unit 64 operates in the same manner as the topology filter unit 24 in the first exemplary embodiment, except that the topology filter unit 64 applies the filter condition supplied by the in-band communication unit 62.

The topology notification unit 65 operates in the same manner as the topology notification unit 25 in the first exemplary embodiment, except that the topology notification unit 65 applies the transmission timing condition supplied by the in-band communication unit 62.

A topology holding unit 61 and a packet processing unit 63 operate in the same manner as the topology holding unit 21 and the packet processing unit 23, respectively, in the first exemplary embodiment.

Next, the operation of the communication system (FIG. 11) of the present exemplary embodiment will be described using a concrete example in which three forwarding nodes 60A to 60C and the control apparatus 50A are connected in series.

Figure 12:
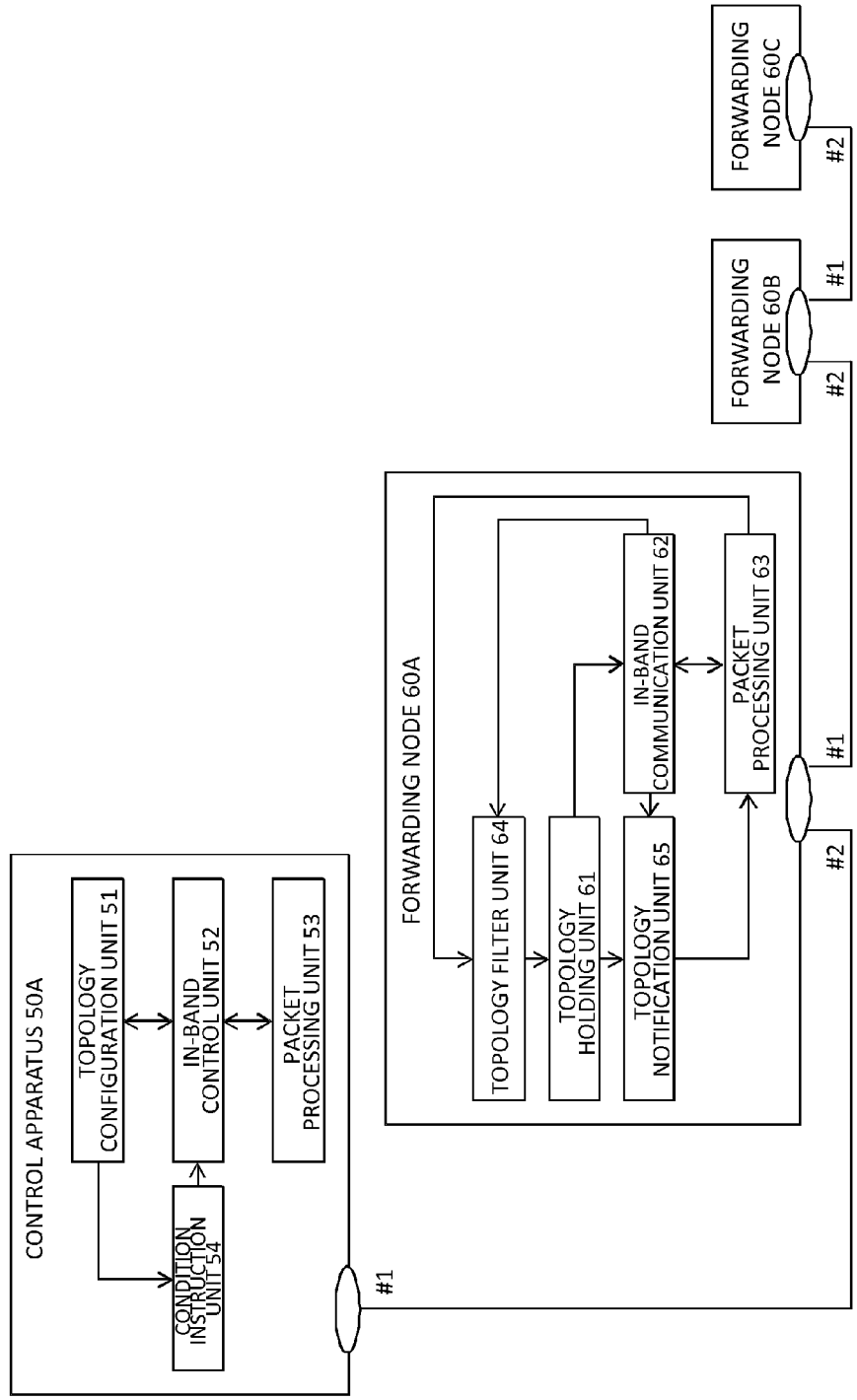
FIG. 12 is a drawing for explaining an example of an operation of the communication system relating to a second exemplary embodiment.

FIG. 12 is a drawing for explaining the operation of the communication system relating to the present exemplary embodiment. FIG. 12 shows that the communication system has the control apparatus 50A and the three forwarding nodes 60A to 60C connected in series. In FIG. 12, signs #1 and #2 given among the control apparatus 50A and the three forwarding nodes 60A to 60C indicate the identifiers of communication ports.

In the similar manner as the operation of the communication system relating to the first exemplary embodiment described with references to FIGS. 3 to 10, the control apparatus 50A is able to ultimately establish control channels with all of the forwarding nodes 60A to 60C.

The condition instruction unit 54 of the control apparatus 50A transmits filter conditions and transmission timing conditions appropriately set for each of the forwarding nodes 60A to 60C to each of the forwarding nodes 60A to 60C via the control channels established by the in-band control unit 52.

The in-band communication unit 62 of the forwarding node 60A outputs the filter condition received via the control channel to the topology filter unit 64. Further, the in-band communication unit 62 outputs the transmission timing condition received via the control channel to the topology notification unit 65. The topology filter unit 64 of the forwarding node 60A holds the supplied filter condition and applies the condition for filtering the subsequent topology information. The topology notification unit 65 of the forwarding node 60A holds the supplied transmission timing condition and applies it as a condition for controlling the timing of subsequent topology notifications to the surrounding forwarding nodes and the control apparatus 50A.

Similarly, each of the forwarding nodes 60B and 60C also holds and applies specified filter conditions and transmission conditions.

According to the communication system of the present exemplary embodiment, the control apparatus 50A is able to control the filter condition and the transmission timing condition for each forwarding node that exists in the network. As a result, the control apparatus 50A is able to centrally manage the control of the amount of packet exchanges for discovering the state of the topology and the control of the time required to discover any topology change. Consequently, it facilitates the reflection of the network operation policy of a network operator.

Further, modes described below as modes are possible in the present invention.

(Mode 1)
A communication system may be the communication system according to the first aspect of the present invention.

(Mode 2)
The communication system according to mode 1, wherein the topology holding unit updates the first topology information held in the own node based on the first topology information received from the node(s) adjacent to the own node among the plurality of forwarding nodes.

(Mode 3)
The communication system according to mode 2, wherein the topology holding unit holds as the first topology information connection relationship between the own node and a node(s) within a predetermined hop number from the own node among the group of nodes.

(Mode 4)
The communication system according to mode 2, wherein the topology notification unit uses, as a condition for notifying the first topology information to the node(s) adjacent to the own node among the group of nodes, at least one of:
the first topology information held by the topology holding unit has been updated;
a predetermined time period has passed since the update; and
a predetermined time period has passed since a previous notification.

(Mode 5)
The communication system according to mode 3, wherein the control apparatus further comprises a condition instruction unit that specifies the predetermined hop number for the plurality of forwarding nodes via the control channel.

(Mode 6)
The communication system according to mode 4, wherein the control apparatus further comprises a condition instruction unit that specifies the condition for the plurality of forwarding nodes via the control channel.

(Mode 7)
A forwarding node may be the forwarding node according to the second aspect of the present invention.

(Mode 8)
The forwarding node according to mode 7, wherein the topology holding unit updates the first topology information held in the own node based on the first topology information received from the node(s) adjacent to the own node among the plurality of forwarding nodes.

(Mode 9)
The forwarding node according to mode 8, wherein the topology holding unit holds as the first topology information connection relationship between the own node and a node(s) within a predetermined hop number from the own node among the group of nodes.

(Mode 10)
The forwarding node according to mode 8, wherein the topology notification unit uses, as a condition for notifying the first topology information to the node(s) adjacent to the own node among the group of nodes, at least one of:
the first topology information held by the topology holding unit has been updated;
a predetermined time period has passed since the update; and
a predetermined time period has passed since a previous notification.

(Mode 11)
The forwarding node according to mode 9, configured to receive an instruction of the predetermined hop number from the control apparatus via the control channel.

(Mode 12)
The forwarding node according to mode 10, configured to receive an instruction of the condition from the control apparatus via the control channel.

(Mode 13)
A control apparatus may be the control apparatus according to the third aspect of the present invention.

(Mode 14)
The control apparatus according to mode 13, wherein the plurality of forwarding nodes update the first topology information held in the own node based on the first topology information received from the node(s) adjacent to the own node among the plurality of forwarding nodes.

(Mode 15)
The control apparatus according to mode 13, wherein
the plurality of forwarding nodes hold as the first topology information connection relationship between the own node and a node(s) within a predetermined hop number from the own node among the group of nodes.
(Mode 16)
The control apparatus according to mode 14, wherein
the plurality of forwarding nodes use. as a condition for notifying the first topology information to the node(s) adjacent to the own node among the group of nodes, at least one of:
the first topology information held by the topology holding unit has been updated;
a predetermined time period has passed since the update; and
a predetermined time period has passed since a previous notification.
(Mode 17)
The control apparatus according to mode 15, further comprising:
a condition instruction unit that specifies the predetermined hop number for the plurality of forwarding nodes via the control channel.
(Mode 18)
The control apparatus according to mode 16, further comprising:
a condition instruction unit that specifies the condition for the plurality of forwarding nodes via the control channel.
(Mode 19)
A control method may be the control method according to the fourth aspect of the present invention.
(Mode 20)
The control method according to mode 19, comprising:
by the plurality of forwarding nodes, updating the first topology information held in the own node based on the first topology information received from the node(s) adjacent to the own node among the plurality of forwarding nodes.
(Mode 21)
The control method according to mode 20, wherein
the plurality of forwarding nodes hold as the first topology information connection relationship between the own node and a node(s) within a predetermined hop number from the own node among the group of nodes.
(Mode 22)
The control method according to mode 20, wherein
the plurality of forwarding nodes use as a condition for notifying the first topology information to the node(s) adjacent to the own node among the group of nodes, at least one of:
the first topology information held by the topology holding unit has been updated;
a predetermined time period has passed since the update; and
a predetermined time period has passed since a previous notification.
(Mode 23)
A control method may be the control method according to the fifth aspect of the present invention.
(Mode 24)
A control method, comprising:
by a control apparatus that controls a plurality of forwarding nodes, generating second topology information by combining a plurality of pieces of first topology information notified by the plurality of forwarding nodes; and
deriving a path from the control apparatus to the plurality of forwarding nodes based on the second topology information and establishing a control channel for controlling the plurality of forwarding nodes along the derived path, wherein
the plurality of forwarding nodes hold as the first topology information connection relationship between an own node and at least part of a group of nodes including the plurality of forwarding nodes and the control apparatus, and notify the control apparatus and a node(s) adjacent to the own node among the group of nodes of the first topology information.
(Mode 25)
A program, causing a computer provided in one of a plurality of forwarding nodes controlled by a control apparatus to execute:
holding as first topology information connection relationship between an own node and at least part of a group of nodes including the control apparatus and the plurality of forwarding nodes;
notifying a node(s) adjacent to the own node among the group of nodes of the first topology information; and
notifying the control apparatus of the first topology information.
(Mode 26)
A program, causing a computer provided in a control apparatus that controls a plurality of forwarding nodes to execute:
generating second topology information by combining a plurality of pieces of first topology information notified by the plurality of forwarding nodes; and
deriving a path from the control apparatus to the plurality of forwarding nodes based on the second topology information, and establishing a control channel for controlling the plurality of forwarding nodes along the derived path, wherein
the plurality of forwarding nodes hold as the first topology information connection relationship between an own node and at least part of a group of nodes including the plurality of forwarding nodes and the control apparatus, and notify the control apparatus and a node(s) adjacent to the own node among the group of nodes of the first topology information.
(Mode 27)
A non-transitory computer-readable storage medium holding the program according to mode 25 or 26.

Further, the disclosure of each Patent Literature and Non-Patent Literature cited above is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications. Particularly, the ranges of the numerical values used in the present description should be interpreted as a specific numeric value or small range included in the ranges even in cases where it is not stated so.

10A, 50A: control apparatus
11, 51: topology configuration unit
12, 52: in-band control unit
13, 53: packet processing unit
20A to 20D, 60A to 60D: forwarding nodes
21, 61: topology holding unit
22, 62: in-band communication unit 23, 63: packet processing unit
24, 64: topology filter unit
25, 65: topology notification unit
30A: transmission topology information
30B: reception topology information
31A, 31B: topology information
32A, 32B: transmission source forwarding nodes
33A, 33B: transmission source communication port
34B: destination communication port
40 to 44: packet
54: condition instruction unit

What is claimed is:

1. A communication system, comprising:
a group of nodes including a plurality of forwarding nodes and a control apparatus that controls the plurality of forwarding nodes,
wherein the plurality of forwarding node comprises:
   a topology holding unit that holds as first topology information connection relationship between an own node and at least a part of the group of nodes;
   a topology notification unit that notifies a node(s) adjacent to the own node among the group of nodes of the first topology information; and
   an in-band communication unit that notifies the control apparatus of the first topology information, and
wherein the control apparatus comprises;
   a topology configuration unit that generates second topology information by combining a plurality of pieces of the first topology information notified by the plurality of forwarding nodes; and
   an in-band control unit derives a path from the control apparatus to the plurality of forwarding nodes based on the second topology information and establishes a control channel for controlling the plurality of forwarding nodes along the derived path,
wherein the topology holding unit updates the first topology information held in the own node based on the first topology information received from the node(s) adjacent to the own node among the plurality of forwarding nodes, and
wherein the topology holding unit holds, as the first topology information, a connection relationship between the own node and a node(s) within a predetermined hop number from the own node among the group of nodes.

2. The communication system according to claim 1, wherein the control apparatus further comprises a condition instruction unit that specifies the predetermined hop number for the plurality of forwarding nodes via the control channel.

3. A communication system, comprising:
a group of nodes including a plurality of forwarding nodes and a control apparatus that controls the plurality of forwarding nodes,
wherein the plurality of forwarding nodes comprises:
   a topology holding unit that holds as first topology information connection relationship between an own node and at least a part of the group of nodes;
   a topology notification unit that notifies a node(s) adjacent to the own node among the group of nodes of the first topology information; and
   an in-band communication unit that notifies the control apparatus of the first topology information, and
wherein the control apparatus comprises:
   a topology configuration unit that generates second topology information by combining a plurality of pieces of the first topology information notified by the plurality of forwarding nodes; and
   an in-band control unit that derives a path from the control apparatus to the plurality of forwarding nodes based on the second topology information and establishes a control channel for controlling the plurality of forwarding nodes along the derived path,
wherein the topology holding unit updates the first topology information held in the own node based on the first topology information received from the node(s) adjacent to the own node among the plurality of forwarding nodes, and
wherein the topology notification unit uses, as a condition for notifying the first topology information to the node(s) adjacent to the own node among the group of nodes, at least one of:
the first topology information held by the topology holding unit has been updated;
a predetermined time period has passed since the update; and
a predetermined time period has passed since a previous notification.

4. The communication system according to claim 3, wherein the control apparatus further comprises a condition instruction unit that specifies a condition for the plurality of forwarding nodes via the control channel.

5. A forwarding node among a plurality of forwarding nodes controlled by a control apparatus, the forwarding node comprising:
   a topology holding unit that holds as first topology information connection relationship between an own node and at least a part of a group of nodes including the control apparatus and the plurality of forwarding nodes;
   a topology notification unit that notifies a node(s) adjacent to the own node among the group of nodes of the first topology information; and
   an in-band communication unit that notifies the control apparatus of the first topology information,
wherein the topology holding unit updates the first topology information held in the own node based on the first topology information received from the node(s) adjacent to the own node among the plurality of forwarding nodes, and
wherein the topology holding unit holds, as the first topology information, a connection relationship between the own node and a node(s) within a predetermined hop number from the own node among the group of nodes.

6. The forwarding node according to claim 5, configured to receive an instruction of the predetermined hop number from the control apparatus via the control channel.

7. A forwarding node among a plurality of forwarding nodes controlled by a control apparatus, the forwarding node comprising:
   a topology holding unit that holds as first topology information connection relationship between an own node and at least a part of a group of nodes including the control apparatus and the plurality of forwarding nodes;
   a topology notification unit that notifies a node(s) adjacent to the own node among the group of nodes of the first topology information; and
   as in-band communication unit that notifies the control apparatus of the first topology information,
wherein the topology holding unit updates the first topology information held in the own node based on the first topology information received from the node(s) adjacent to the own node among the plurality of forwarding nodes, and wherein the topology notification unit uses, as a condition for notifying the first topology information to the node(s) adjacent to the own node among the group of nodes, at least one of:
the first topology information held by the topology holding unit has been updated;
a predetermined time period has passed since the update; and
a predetermined time period has passed since a previous notification.

8. The forwarding node according to claim 7, configured to receive an instruction of the condition from the control apparatus via the control channel.

9. A control apparatus for controlling a plurality of forwarding nodes, wherein the plurality of forwarding nodes hold, as first topology information, a connection relationship between an own node and at least of a group of nodes including the plurality of forwarding nodes and the control apparatus, and notify the control apparatus and a node(s) adjacent to the own node among the group of nodes of the first topology information, and the control apparatus comprises:
a topology configuration unit that generates second topology information by combining a plurality of pieces of the first topology information notified by the plurality of forwarding nodes; and
an in-band control unit that derives a path from the control apparatus to the plurality of forwarding nodes based on the second topology information and establishes a control channel for controlling the plurality of forwarding nodes along the derived path,
wherein the plurality of forwarding nodes hold, as the first topology information connection, a relationship between the own node and a node(s) within a predetermined hop number from the own node among the group of nodes.

10. The control apparatus according to claim 9, further comprising:
a condition instruction unit that specifies the predetermined hop number for the plurality of forwarding nodes via the control channel.

11. A control apparatus for controlling a plurality of forwarding nodes, wherein the plurality of forwarding nodes hold, as first topology information, a connection relationship between an own node and at least part of a group of nodes including the plurality of forwarding nodes and the control apparatus, and notify the control apparatus and a node(s) adjacent to the own node among the group of nodes of the first topology information, and the control apparatus comprises:
a topology configuration unit that generates second topology information by combining a plurality of pieces of the first topology information notified by the plurality of forwarding nodes; and
an in-band control unit that derives a path from the control apparatus to the plurality of forwarding nodes based on the second topology information and establishes a control channel for controlling the plurality of forwarding nodes along, the derived part,
wherein the plurality of forwarding nodes update the first topology information held in the own node based on the first topology information received from the node(s) adjacent to the own node among the plurality of forwarding nodes, and wherein the plurality of forwarding nodes use, as a condition for notifying the first topology information to the node(s) adjacent to the own node among the group of nodes, at least one of:
the first topology information held by the topology holding unit has been updated;
a predetermined time period has passed since the update; and
a predetermined time period has passed since a previous notification.

12. The control apparatus according to claim 11, further comprising:
a condition instruction unit that specifies a condition for the plurality of forwarding nodes via the control channel.

13. A control method for controlling a plurality of forwarding nodes using a control apparatus, the control method comprising:
by the plurality of forwarding nodes, holding as first topology information connection relationship between an own node and at least a part of a group of nodes including the plurality of forwarding nodes and the control apparatus;
notifying a node(s) adjacent to the own node among the group of nodes of the first topology information;
notifying the control apparatus of the first topology information;
by the control apparatus, generating second topology information by combining a plurality of pieces of the first topology information notified by the plurality of forwarding nodes;
deriving a path from the control apparatus to the plurality of forwarding nodes based on the second topology information;
establishing a control channel for controlling the plurality of forwarding nodes along the derived path; and
by the plurality of forwarding nodes, updating the first topology information held in the own node based on the first topology information received from the node(s) adjacent to the own node among the plurality of forwarding nodes,
wherein the plurality of forwarding nodes hold as the first topology information connection relationship between the own node and a node(s) within a predetermined hop number from the own node among the group of nodes.

14. A control method for controlling a plurality of forwarding nodes using a control apparatus, the control method comprising:
by the plurality of forwarding nodes, holding as first topology information connection relationship between an own node and at least a part of a group of nodes including the plurality of forwarding nodes and the control apparatus;
notifying a node(s) adjacent to the own node among the group of nodes of the first topology information;
notifying the control apparatus of the first topology information;
by the control apparatus, generating second topology information by combining a plurality of pieces of the first topology information notified by the plurality of forwarding nodes;
deriving a path from the control apparatus to the plurality of forwarding nodes based on the second topology information;
establishing a control channel for controlling the plurality of forwarding nodes along the derived path; and by the plurality of forwarding nodes, updating the first topology information held in the own node based on the first topology information received from the node(s) adjacent to the own node among the plurality of forwarding nodes, wherein the plurality of forwarding nodes use, as a condition for notifying the first topology information to the node(s) adjacent to the own node among the group of nodes, at least one of:

the first topology information held by the own node has been updated;

a predetermined time period has passed since the update; and a predetermined time period has passed since a previous notification.

* * * * *